(12) United States Patent
Ueshima et al.

(10) Patent No.: US 8,790,472 B2
(45) Date of Patent: Jul. 29, 2014

(54) PROCESS FOR PRODUCING A SOLDER PREFORM HAVING HIGH-MELTING METAL PARTICLES DISPERSED THEREIN

(75) Inventors: Minoru Ueshima, Matsudo (JP); Takashi Ishii, Mooka (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 1997 days.

(21) Appl. No.: 11/628,746

(22) PCT Filed: May 9, 2005

(86) PCT No.: PCT/JP2005/008417
§ 371 (c)(1),
(2), (4) Date: Aug. 29, 2008

(87) PCT Pub. No.: WO2005/120765
PCT Pub. Date: Dec. 22, 2005

(65) Prior Publication Data
US 2009/0014092 A1    Jan. 15, 2009

(30) Foreign Application Priority Data

Jun. 8, 2004 (JP) ................................ 2004-169342

(51) Int. Cl.
*B22D 17/00*    (2006.01)
(52) U.S. Cl.
USPC ......................................... 148/538; 428/567
(58) Field of Classification Search
USPC .................................. 428/614, 567; 148/538
IPC .............. C22C 5/08; C23C 18/1635; B22F 7/08
See application file for complete search history.

(56) References Cited

U.S. PATENT DOCUMENTS

| | | | |
|---|---|---|---|
| 3,472,365 A | 10/1969 | Tiedema et al. | 206/56 |
| 4,358,884 A * | 11/1982 | Harvey et al. | 29/402.18 |
| 4,663,815 A | 5/1987 | Hartman et al. | 29/839 |
| 5,134,039 A | 7/1992 | Alexander et al. | 428/614 |
| 5,346,775 A * | 9/1994 | Jin et al. | 428/614 |
| 5,736,074 A | 4/1998 | Hayes et al. | 264/6 |
| 7,793,820 B2 | 9/2010 | Hirano et al. | 228/246 |
| 7,800,230 B2 | 9/2010 | Hirano et al. | 257/772 |
| 2001/0045244 A1 | 11/2001 | Akaike et al. | 148/25 |
| 2005/0260095 A1 | 11/2005 | Hasegawa | 420/562 |
| 2009/0236725 A1 | 9/2009 | Hirano et al. | 257/690 |
| 2011/0068149 A1 | 3/2011 | Hirano et al. | 228/56.3 |

FOREIGN PATENT DOCUMENTS

| | | |
|---|---|---|
| CH | 225008 | 4/1943 |
| EP | 0612577 | 2/1994 |
| EP | 1769881 | 4/2007 |
| JP | 59140437 | 9/1984 |
| JP | 03281088 | 12/1991 |
| JP | 05101751 | 4/1993 |
| JP | 06031486 | 2/1994 |
| JP | 06232188 | 8/1994 |
| JP | 06285686 | 10/1994 |
| JP | 06315790 | 11/1994 |
| JP | 2001239397 | 9/2001 |
| JP | 2002305213 | 10/2002 |
| JP | 2005161338 | 6/2005 |
| WO | 2007125991 | 11/2007 |

* cited by examiner

*Primary Examiner* — Weiping Zhu
(74) *Attorney, Agent, or Firm* — Michael Tobias

(57) ABSTRACT

[Problems] A conventional process for producing a solder preform in which a predetermined amount of high-melting metal particles are directly put into molten solder and stirred, requires a long time for dispersing the high-melting metal particles by stirring. Therefore, in the conventional method for producing a solder preform, dissolution of the high-melting metal particles into the molten solder occurred during stirring, and their particle diameters became small. If a semiconductor chip and a substrate are soldered with a solder preform containing metal particles having such decreased diameters, the space between portions being soldered becomes narrow, and a sufficient bonding strength is not obtained.

[Means for Solving the Problems] In the present invention, a premixed master alloy having a higher proportion of the high-melting metal particles in solder is first prepared, then the premixed master alloy is put into molten solder to disperse the high-melting metal particles. As a result, the high-melting metal particles can be uniformly dispersed in solder in a short length of time. Accordingly, a solder preform which is obtained by the process for producing a solder preform according to the present invention can maintain a predetermined clearance between portions being soldered, and a sufficient bonding strength is obtained.

11 Claims, No Drawings

PROCESS FOR PRODUCING A SOLDER PREFORM HAVING HIGH-MELTING METAL PARTICLES DISPERSED THEREIN

TECHNICAL FIELD

This invention relates to a process for producing a solder preform containing high-melting metal particles uniformly dispersed therein.

BACKGROUND ART

A workpiece such as a printed substrate or an electronic component used in electronic equipment is typically soldered by the soldering iron method, the flow soldering method, or the reflow soldering method. In the soldering iron method, soldering is performed by placing a flux-cored wire solder on a portion to be soldered of a workpiece and then heating the wire solder from above by a soldering iron until the flux-cored wire solder is melted. In the soldering iron method, soldering is carried out at one location to be soldered at a time, so it is not suited to mass production, but it is suited for soldering electronic parts having low heat resistance to a workpiece on which soldering has been performed by other soldering methods or for repairing soldering defects which occur with other soldering methods.

In the flow soldering method, a printed wiring board having electronic parts placed thereon is contacted with molten solder. This method has excellent productivity in that many locations of the board can be soldered at the same time. However, in the flow soldering method, since the entirety of a printed wiring board is brought into contact with molten solder, it has problems in that solder adheres to unnecessary locations and molten solder at a high temperature directly contacts electronic parts, thereby causing thermal damage to electronic parts.

In the reflow soldering method, soldering is carried out by placing solder only on necessary locations of a workpiece and then heating the solder with a heating apparatus such as a reflow furnace, an infrared radiation apparatus, or a laser apparatus. Therefore, it not only has excellent productivity but also excellent reliability of soldering in that solder does not adhere to unnecessary locations. Accordingly, the reflow soldering method is much employed for soldering of today's workpieces which require high reliability.

Solders which are used for the reflow soldering method include solder pastes and solder preforms. A solder paste is obtained by mixing a viscous flux and solder powder, and it is applied to the portions to be soldered of a workpiece by printing or with a dispenser. A flux used in a solder paste contains flux components such as a rosin, an activator, and a thixotropic agent dissolved in a solvent. As a result, soldering with a solder paste always leaves flux residue. During soldering with a solder paste, the activator, the thixotropic agent, the solvent, or similar components in the paste almost entirely vaporize, but they do not completely vaporize, and a slight amount thereof remains in the flux residue. The flux components tend to absorb moisture, and as the flux components remaining in the flux residue absorb moisture from the atmosphere, they sometimes form corrosive products on or around the soldered joint or decrease the insulation resistance of the soldered joint. Therefore, a solder paste is not suitable for soldering of a workpiece requiring high reliability.

Thus, a solder preform which can be used for soldering without using a flux is suitable for soldering of workpieces requiring high reliability. A solder preform is a pellet or a washer having a shape suited for the portion to be soldered. In reflow soldering using a solder preform, the solder preform is placed on a workpiece and then heated in a reducing atmosphere such as a hydrogen gas atmosphere. When a workpiece having a solder preform placed thereon is heated in a hydrogen gas atmosphere, the hydrogen reduces and removes oxides formed on the surface of the workpiece and the solder preform and enables them to be wet by molten solder.

For a workpiece requiring high reliability, such as one soldered by die bonding, since a solder paste which leaves a flux residue cannot be employed, a solder preform is used. In die bonding, a substrate and a semiconductor chip are joined with solder. Soldering is carried out by placing a solder preform between the substrate and the semiconductor chip followed by heating in a reducing atmosphere.

When a solder preform and a semiconductor chip are placed on a substrate and heated, as the solder preform melts, the molten solder may sometimes be protruded from the area between the portions being soldered due to pressing by the weight of the semiconductor chip, thereby decreasing the amount of solder present between the portions being soldered. Bonding by means of soldering can afford a sufficient bonding strength provided that an adequate amount of solder is present between portions being soldered. However, if solder is protruded from the area between portions being soldered by the weight of a semiconductor chip which is placed on top of it as is the case in die bonding, the bonding strength ends up becoming weak.

In order to provide a suitable clearance between portions being soldered and to maintain a suitable amount of solder between the portions being soldered, in the prior art, a plurality of particles or spheres of a high-melting metal (referred to below simply as metal particles) having a higher melting point than solder, such as Ni, Cu, Ag, Fe, Mo, or W, have been interposed between portions being soldered. Separately placing the metal particles between the portions being soldered at the time of soldering is extremely time consuming and results in poor efficiency. Therefore, solder preforms already having metal particles dispersed therein have been used.

Methods of producing solder preforms having metal particles dispersed therein include the pressing method and the melting method. In the pressing method, a large number of metal particles are placed atop a single solder sheet, and the metal particles are embedded in the solder sheet by passing the sheet between a pair of rollers (Patent Document 1), or metal particles are sandwiched between two solder sheets and then punched out with a press (Patent Document 2).

In the melting method, metal particles are dispersed in molten solder, the molten solder is then cast into a mold to form a billet, the billet is formed into a solder sheet by extrusion, and then the solder sheet is punched out with a press (Patent Document 3). In the melting method described in Patent Document 3, the surfaces of metal particles are subjected to electroplating or electroless plating. Next, a mixture of the metal particles and a flux is put into molten solder and stirred, and then the molten solder is cast into a mold to form a billet. The billet is then rolled to form a sheet, which is then shaped by a press into solder preforms having a predetermined shape.

Patent Document 1: JP 03-281088 A1
Patent Document 2: JP 06-285686 A1
Patent Document 3: JP 06-31486 A1

DISCLOSURE OF THE INVENTION

Problem which the Invention is to Solve

A solder preform obtained by the pressing method has metal particles which are mechanically embedded in a solder sheet or sandwiched between solder sheets, and the metal particles are not wet by solder. Namely, the metal particles and the solder are not metallically bonded to each other. Therefore, if such a solder preform is placed between portions to be soldered and melted, the locations where the metal particles and the portions being soldered contact each other do not form a metallic bond. In this state, the metal particles and the portions being soldered are not bonded to each other. Accordingly, the area of bonding between the portions being soldered and the solder becomes small, and the bonding strength is not sufficiently strong.

In contrast, with a solder preform obtained by the conventional melting method, the metal particles and the solder are metallically bonded to each other, and the entirety of the portions being soldered are bonded by solder. However, with a solder preform obtained by the conventional melting method, the particle diameters of the metal particles present between the portions being soldered became small or the metal particles entirely disappeared, and it was not possible to obtain a predetermined clearance between the portions being soldered. As a result, there was the problem that the amount of solder between the substrate and the semiconductor chip became insufficient, thereby making the bonding strength weak.

Means for Solving the Problem

The present inventors carried out diligent investigations concerning the cause of why the particle diameters of metal particles decrease or the metal particles disappear in a solder preform obtained by the conventional melting method. As a result, they found that the cause is that the metal particles dissolve into the molten solder. Namely, with the conventional melting method, a small amount of metal particles which are to be ultimately included in a solder preform are directly put into a large volume of molten solder in order to wet the metal particles with the molten solder, and it takes a long time to uniformly disperse the metal particles in the molten solder. In the conventional melting method, because a long time is required for uniform dispersion of the metal particles, the metal particles dissolve into the molten solder, thereby causing the metal particles to have a decreased particle diameter or completely disappear. The metal particles have a higher melting point than solder, and they should not melt at a temperature used for melting solder, but for the following reason, the metal particles dissolve into the molten solder.

Namely, when the surfaces of the metal particles are wet by solder, diffusion of atoms which results in alloying occurs between the solder and the metal particles in the wetted portions. If alloying of the high-melting metal of the particles with the solder occurs, the alloyed portions of the metal particles have a decreased melting point and thus can dissolve into the molten solder. In this manner, the metal particles gradually dissolve into the molten solder, and the metal particles decrease in particle diameter, or they end up entirely disappearing. The present inventors realized that if metal particles are dispersed in molten solder in a short length of time after the metal particles are put into molten solder, the metal particles will not decrease in diameter, and they completed the present invention.

The present invention is a process for producing a solder preform having high-melting metal particles dispersed therein, characterized by comprising the steps of preparing a premixed master alloy having high-melting metal particles dispersed in solder such that the amount of the metal particles mixed in the master alloy is 5-30 mass percent based on the amount of the solder; putting the premixed master alloy into molten solder such that the amount of the high-melting metal particles is 0.1-3 mass percent based on the molten solder followed by stirring; casting the molten solder having a prescribed amount of the metal particles mixed therein into a mold to form a billet; and subjecting the billet to working into the form of a solder sheet and then shaping into the form of a solder preform having a predetermined shape.

A premixed master alloy used herein and a master alloy typically used in alloying of metals are similar with respect to the method of use, but they differ from each other with respect to structure. A master alloy typically used in alloying contains an alloying metallic element which is added to a molten metal in a higher concentration and completely melted therein. When actually used to prepare an alloy having a predetermined composition, the master alloy is diluted with molten metal. On the other hand, a premixed master alloy used herein contains high-melting metal particles which are dispersed in solder in the form of metal particles without melting, and when it is actually used to make a desired composition, a weighed amount of the premixed master alloy is put into molten solder.

Effects of the Invention

According to the present invention, a premixed master alloy containing a higher proportion of metal particles previously mixed therein is prepared, and the premixed master alloy is measured out and put into molten solder in an amount sufficient to obtain a predetermined proportion of the metal particles in a solder preform. Therefore, the metal particles are uniformly dispersed in the molten solder by stirring for just a short period of time after the premixed master alloy is put into the molten solder. The molten solder containing the metal particles uniformly dispersed therein is immediately cast into a mold to form a billet.

In the present invention, the step of preparing a premixed master alloy, the step of putting the premixed master alloy into molten solder and stirring, and the step of casting into a mold are each carried out in a short length of time, so the time for which metal particles contact molten solder can be made extremely short. As a result, with a solder preform obtained by the present invention, dissolution of metal particles into molten solder is minimized, and the metal particles are dispersed in the solder preform with roughly keeping their original form. Accordingly, a solder preform obtained by the present invention has metal particles wet by the molten solder, and a predetermined clearance can be obtained between the portions being soldered, so the inherent bonding strength of solder can be achieved.

BEST MODE FOR CARRYING OUT THE INVENTION

In order to uniformly disperse metal particles in molten solder and completely solder the portions to be soldered of a workpiece and the metal particles at the time of soldering, the metal particles must be completely wet by molten solder. Particles of a metal which is readily wet by molten solder such as Ag or Cu can be easily wet by molten solder simply with the aid of flux, but particles of a metal which is difficult to wet by molten solder such as Ni, Mo, Cr, or W cannot be wet with molten solder by means of flux alone. Thus, metal particles which are not readily wet by molten solder must previously be subjected to surface treatment. Examples of surface treatment for metal particles are hydrogen cleaning treatment and plating. In hydrogen cleaning treatment, metal particles are heated in an atmosphere filled with hydrogen, whereby oxides deposited on the surface of the metal particles are removed by reduction. In plating treatment, metal particles are plated with a metallic element which does not greatly change the composition or properties of solder even if it dissolves into molten solder. An example of such a metallic element is an element which is used in the solder, such as Sn, Ag, or Cu in the case of a Sn—Ag—Cu solder. An example of an element which does not greatly change the properties of the molten solder even if it dissolves therein is Au having an extremely low plating weight.

In the present invention, metal particles are not directly put into a molten metal so as to achieve a predetermined proportion for a solder preform. Rather, they are initially formed into a premixed master alloy in which the metal particles have a higher proportion, and the premixed master alloy is put into molten solder. Examples of a method for preparing the premixed master alloy in the present invention are a method in which a mixture of a flux and metal particles is directly introduced into molten solder which is to become the master alloy, and a method in which a mixture of a flux, metal particles, and solder powder is placed into a heat resistant vessel and heated until the solder powder is melted, and the mixture is then cooled and solidified.

In the present invention, first a greater proportion of metal particles than the proportion of the metal particles to be dispersed in the desired solder preform are dispersed in molten solder to prepare a premixed master alloy in which the metal particles are mixed with the molten solder in such conditions that they are wet by the molten solder. A suitable proportion of the metal particles in the premixed master alloy is 5-30 mass percent. Theoretically, the opposing portions to be soldered can be maintained parallel so as to make a fixed clearance if at least four dispersed metal particles are present between the portions to be soldered. However, if these four metal particles are arranged in a straight line or if they gather in one location, the opposing portions to be soldered cannot become parallel and a fixed clearance cannot be maintained. Thus, the metal particles are desirably dispersed over the entirety of the portions to be soldered. For example, in the case of soldering a semiconductor chip to a substrate with a solder pellet measuring 10×10 (mm), which is frequently used in die bonding, at least 10 metal particles should be interspersed between the portions to be soldered of the workpieces. If the proportion of the metal particles in the premixed master alloy is lower than 5 mass percent, a suitable amount of metal particles cannot be dispersed in the solder preform, while if they are present in excess of 30 mass percent in the master alloy, the metal particles end up aggregating during the preparation of the master alloy and are no longer uniformly dispersed in the molten solder.

Next, an example of the present invention and a comparative example will be described.

EXAMPLE (1) Ni particles with a diameter of 80 micrometers are heated in a hydrogen atmosphere to clean their surfaces.

(2) 10 g of Ni particles, the surfaces of which have been cleaned, 90 g of a flux in the form of a paste, and 90 g of Sn-3Ag-0.5Cu solder powder are kneaded together to form a paste-like mixture. The mixture is placed into a cast iron ladle, and the ladle is heated with a gas burner so as to melt the solder powder at 250° C. while the melt is stirred for approximately 30 seconds with a metal spatula. The mixture is then cast into a 5×10×50 (mm) mold to prepare a bar of a premixed master alloy. The proportion of Ni particles in this master alloy is 10 mass percent.

(3) Approximately 80 kg of a Sn-3Ag-0.5Cu lead-free solder are melted in a melting pot, and 10 kg of the resulting molten solder are transferred from the melting pot into a molten metal pouring device. To this pouring device, 30 g of the premixed master alloy are added and stirred for approximately 10 seconds with a stirrer. Then, the molten solder having Ni particles dispersed therein is cast into a cylindrical mold for forming a billet, and the mold is rapidly cooled to produce a billet.

(4) The billet is passed through an extruder to form a solder bar having a thickness of 5 mm and a width of 20 mm, and the solder bar is rolled in a rolling machine to form a solder sheet having a thickness of 0.1 mm and a width of 15 mm. The solder sheet is then punched with a press to form 10×10 (mm) pellets.

Comparative Example (1) The surfaces of Ni particles with a diameter of 80 micrometers are electroplated with Cu.

(2) 10 g of the Ni particles, the surfaces of which have been plated with Cu, are kneaded with 10 g of a flux in the form of a paste to form a paste-like mixture.

(3) Approximately 80 kg of a Sn-3Ag-0.5Cu lead-free solder are melted in a melting pot, and 160 g of the paste-like mixture are put into the molten solder in the melting pot. After addition of the paste-like mixture, the molten solder is stirred for approximately 60 seconds with a metal spatula to disperse the Ni particles in the molten solder. Then, the molten solder in which the Ni particles are dispersed is cast into a cylindrical mold for forming a billet, and the mold is rapidly cooled to prepare a billet.

(4) The billet is passed through an extruder to form a solder bar with a thickness of 5 mm and a width of 20 mm, and the solder bar is rolled in a rolling machine to prepare a solder sheet with a thickness of 0.1 mm and a width of 15 mm. The solder sheet is then punched with a press to form 10×10 (mm) pellets.

Four corners of a pellet obtained in each of the above described example and comparative example were cut off, and the cut surfaces were examined with a microscope. With the pellet obtained in the example, a large number of Ni particles which had a diameter of 70-80 micrometers were present in the four corners. In contrast, with the pellet obtained in the comparative example, although Ni particles were present in the four corners, the diameters of the particles greatly varied from 10 to 70 micrometers.

Industrial Applicability

A solder preform obtained by the present invention can be used not only for die bonding but also for soldering of coated lids which are used for sealing a semiconductor chip in a container with a lid.

The invention claimed is:

1. A process for producing a solder preform having high-melting metal particles dispersed therein comprising:
preparing a premixed master alloy having high-melting metal particles dispersed in a solder such that the proportion of the high-melting metal particles is 5-30 mass percent based on the amount of the solder;
placing the premixed master alloy into a first molten solder in an amount such that the proportion of the high-melting metal particles is 0.1-3 mass percent based on the first molten solder followed by stirring;

casting the first molten solder having the high-melting metal particles mixed therein into a mold to form a billet; and working the billet to form a solder sheet and then forming a solder preform from the solder sheet.

2. A process as claimed in claim 1 including subjecting the high-melting metal particles to surface treatment prior to preparing the premixed master alloy in order to make the surfaces of the high-melting metal particles easily wettable by the first molten solder.

3. A process as claimed in claim 1 including preparing the premixed master alloy by placing a mixture of a flux and the high-melting metal particles into a second molten solder.

4. A process as claimed in claim 3 wherein preparing the premixed master alloy includes stirring the second molten solder after placing the mixture into the second molten solder to disperse the high-melting metal particles in the second molten solder, and solidifying the second molten solder with the high-melting metal particles dispersed in the second molten solder in an as-stirred state.

5. A process as claimed in claim 3 wherein the first molten solder and the second molten solder have the same composition.

6. A process as claimed in claim 1 including preparing the premixed master alloy by heating a mixture of a flux, the high-melting metal particles, and solder powder to melt the solder powder.

7. A process as claimed in claim 1 wherein forming the billet comprises solidifying the first molten solder in the mold with the high-melting metal particles dispersed in the first molten solder in an as-stirred state.

8. A process as claimed in claim 1 including solidifying the premixed master alloy prior to placing it into the first molten solder.

9. A process as claimed in claim 1 wherein preparing the premixed master alloy comprises dispersing the high-melting metal particles in a second molten solder, and then solidifying the second molten solder at a rate such that there is no substantial decrease in the diameter of the high-melting metal particles.

10. A process as claimed in claim 1 wherein preparing the premixed master alloy comprises dispersing the high-melting metal particles in a second molten solder by stirring, and then solidifying the second molten solder with the high-melting metal particles dispersed in the second molten solder in an as-stirred state.

11. A process for producing a solder preform having high-melting metal particles dispersed therein comprising:

preparing by one of the following methods (i) and (ii) a premixed master alloy having high-melting metal particles dispersed in a solder having a prescribed composition such that the proportion of the high-melting metal particles is 5-30 mass percent based on the amount of the solder;

(i) heating a mixture of a flux, a solder powder having the prescribed composition, and the high-melting metal particles to melt the solder powder; or (ii) adding a mixture of a flux and the high-melting metal particles to a first molten solder having the prescribed composition;

incorporating the premixed master alloy into a second molten solder in an amount such that the proportion of the high-melting metal particles is 0.1-3 mass percent based on the second molten solder following by stirring;

casting the second molten solder having the high-melting metal particles mixed therein into a mold to form a billet; and working the billet to form a solder sheet and then forming a solder preform from the solder sheet.

* * * * *